US010933386B1

(12) United States Patent
Rearden et al.

(10) Patent No.: US 10,933,386 B1
(45) Date of Patent: Mar. 2, 2021

(54) DEVICES AND METHODS FOR INFUSING GAS INTO A LIQUID

(71) Applicant: BIOTHERM HYDRONIC, INC., Cotati, CA (US)

(72) Inventors: Jim Rearden, Petaluma, CA (US); Daniel Whittemore, Sebastopol, CA (US); Chindia Tang Zhejiang, Zhejiang (CN); Thaddius Humphrey, Santa Rosa, CA (US)

(73) Assignee: BioTherm Hydronic, Inc., Cotati, CA (US)

( * ) Notice: Subject to any disclaimer, the term of this patent is extended or adjusted under 35 U.S.C. 154(b) by 170 days.

(21) Appl. No.: 16/424,398

(22) Filed: May 28, 2019

Related U.S. Application Data

(62) Division of application No. 15/647,158, filed on Jul. 11, 2017, now Pat. No. 10,654,006.

(51) Int. Cl.
*B01F 3/04* (2006.01)
*C02F 7/00* (2006.01)
*B01D 15/14* (2006.01)

(52) U.S. Cl.
CPC ...... *B01F 3/04014* (2013.01); *B01F 3/04078* (2013.01); *B01F 3/04099* (2013.01); *B01D 15/14* (2013.01); *C02F 7/00* (2013.01)

(58) Field of Classification Search
CPC ..... B01D 15/14; B01D 63/02; B01F 3/04014; B01F 3/04078; B01F 3/04099; B01F 3/04269; B01F 2003/04319; C02F 7/00
USPC ........................................................ 261/104
See application file for complete search history.

(56) References Cited

U.S. PATENT DOCUMENTS

| 4,007,601 | A | * | 2/1977 | Webbon ................ F25B 19/00 62/100 |
| 4,268,279 | A |  | 5/1981 | Shindo et al. |
| 4,666,469 | A | * | 5/1987 | Krueger ................ B01D 63/02 95/54 |
| 5,149,340 | A | * | 9/1992 | Waycuilis ............ B01D 53/228 95/49 |
| 5,525,143 | A | * | 6/1996 | Morgan ................ B01D 53/22 95/52 |
| 6,209,855 | B1 |  | 4/2001 | Glassford |
| 6,210,464 | B1 | * | 4/2001 | Nakanishi ............ B01D 63/027 95/52 |
| 7,537,200 | B2 |  | 5/2009 | Glassford |

(Continued)

*Primary Examiner* — Charles S Bushey
(74) *Attorney, Agent, or Firm* — Westberg Law Offices

(57) ABSTRACT

A device for infusing gas into a liquid includes a housing and a tube having a width that is smaller than that of the housing and which is positioned within the housing such that the longitudinal axis of the tube is approximately parallel to that of the housing. The device further includes potting compound interposed between an outside surface of the tube and an inside surface of the housing at both ends of the tube. Microporous hollow fibers extend from the potting compound at the first end of the tube and through the potting compound at the second end of the tube. Openings in the device allow for the introduction of gas and liquid into the device. Gas enters the device and into the microporous hollow fibers. Liquid enters the device and is exposed to the outer surfaces of the microporous hollow fibers. Gas passes from the microporous hollow fibers to the liquid and is dissolved into the liquid. Liquid infused with gas exits the device.

13 Claims, 4 Drawing Sheets

(56) References Cited

U.S. PATENT DOCUMENTS

| | | |
|---|---|---|
| 7,717,405 B2 | 5/2010 | Parekh et al. |
| 8,100,385 B2 * | 1/2012 | Nagumo ............ H01M 8/04149 |
| | | 261/102 |
| 8,608,138 B2 | 12/2013 | Cooke |
| 8,690,994 B2 | 4/2014 | Taylor et al. |
| 9,248,408 B2 * | 2/2016 | Kanougi ............... B01D 63/023 |
| 10,654,006 B1 * | 5/2020 | Rearden ............. B01F 3/04014 |
| 2009/0215153 A1 * | 8/2009 | Tsai ....................... C12M 21/12 |
| | | 435/252.7 |
| 2016/0136590 A1 | 5/2016 | Campbell |

* cited by examiner

DEVICES AND METHODS FOR INFUSING GAS INTO A LIQUID

This is a divisional application of application Ser. No. 15/647,158, filed Jul. 11, 2017, now U.S. Pat. No. 10,654,066, the entire contents of which are hereby incorporated by reference.

BACKGROUND OF THE INVENTION

The present invention relates to the field of infusing gas into liquids, and more particularly, for infusing oxygen into water.

There are number of applications for infusing gas into liquids. For example, it is known that plants require water into order to receive nutrients into the plant. However, for the nutrients to be used by the plant, oxygen must also be present. It has been found that increasing the dissolved oxygen content of water used for irrigation can increase plant health as well as crop production yields. Additional applications for infusing gas into liquids can include, for example, aquaculture, distilled spirits production, and treatment of blood disorders.

Various techniques have been used to introduce gas into liquids, such as bubblers and aerators. In addition, porous membranes can be used at the gas-liquid interface to cause gas to be absorbed by, and removed from, liquids. For example, U.S. Pat. No. 4,268,279 discloses a gas transfer process using a hollow fiber membrane. More particularly, this patent discloses a process which comprises allowing a liquid to contact with the inside of a microporous hollow fiber and a fluid to contact with the outside, thereby allowing the gaseous components contained in both fluids to transfer between them.

In order to maximize the benefits of dissolving oxygen into the water used for plant irrigation, it is desired to maximize the amount of dissolved oxygen as well as the time that the oxygen remains dissolved in the water. It is also desired to produce water having increased levels of dissolved oxygen in a manner that is both time-effective and cost-effective. Therefore, what is needed are improved devices and methods for infusing gas into a liquid and, more particularly, for infusing oxygen into water.

SUMMARY OF THE INVENTION

The present invention provides devices and methods for infusing gas into a liquid. In accordance with an embodiment, a device for infusing gas into a liquid comprises a housing and a tube having a width that is smaller than that of the housing which is positioned within the housing such that the longitudinal axis of the tube is approximately parallel to that of the housing. The device further comprises potting compound interposed between an outside surface of the tube and an inside surface of the housing at both ends of the tube. Microporous hollow fibers extend from the potting compound at the first end of the tube and through the potting compound at the second end of the tube. Openings in the device allow for the introduction of gas and liquid into the device. Gas enters the device and into the microporous hollow fibers. Liquid enters the device and is exposed to the outer surfaces of the microporous hollow fibers. Gas passes from the microporous hollow fibers to the liquid and is dissolved into the liquid. Liquid infused with gas exits the device.

This and other embodiments are described in herein.

BRIEF DESCRIPTION OF THE DRAWINGS

The present invention is described with respect to particular exemplary embodiments thereof and reference is accordingly made to the drawings in which.

DETAILED DESCRIPTION

Figure 1:
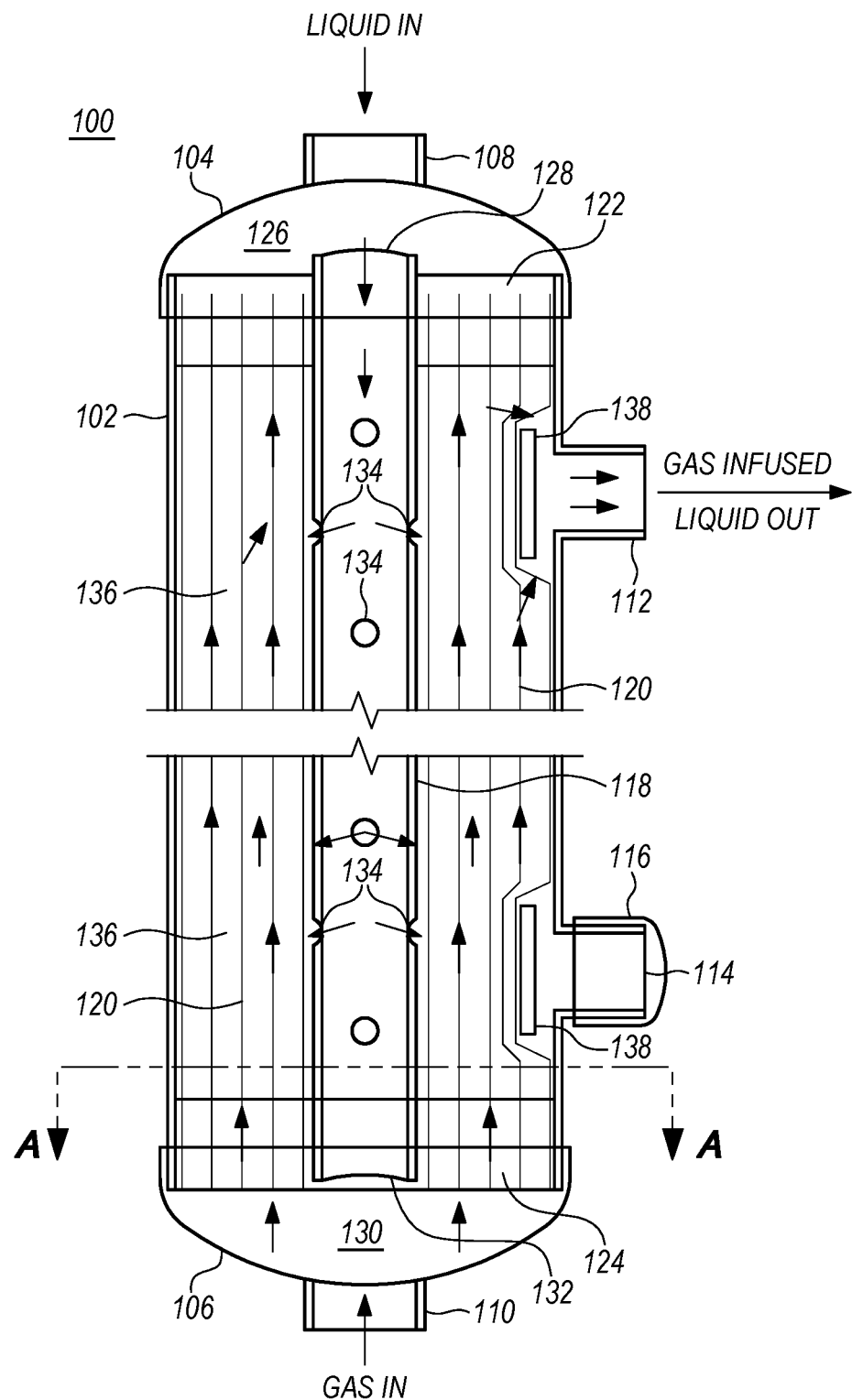
FIG. 1 illustrates a side sectional view of a device for infusing gas into a liquid in accordance with an embodiment of the present invention.

In accordance with an embodiment of the present invention, a device for infusing gas into a liquid is provided. A housing comprises: a first end having a first opening configured to receive a liquid; a second end having a second opening configured to receive a gas; and a central section having a third opening configured to discharge the liquid infused with the gas from the device. A tube has a first end, a second end, a longitudinal axis and a width, wherein the width of the tube is smaller than a width of the housing and the tube is positioned within the housing such that the axis of the tube is approximately parallel to a longitudinal axis of the housing. A potting compound is interposed between an outside surface of the tube and an inside surface of the housing at the first end of the tube wherein a first cavity is formed at the first end of the tube and the first end of the tube and the first opening of the housing are open to the first cavity. The potting compound is interposed between the outside surface of the tube at the second end of the tube and an inside surface of the housing wherein a second cavity is formed at the second end of the tube and the second end of the tube is closed to the second cavity and the second opening in the housing is open to the second cavity. A third cavity is formed between the housing and the tube and is bounded by the potting compound at the ends of the tube. The third opening in the housing is open to the third cavity. At least one opening extends through a wall of the tube to the third cavity. A plurality of microporous hollow fibers extend from the potting compound at the first end of the tube, and pass through the third cavity and the potting compound at the second end of the tube. The hollow fibers are open to the second cavity.

The device may include a baffle positioned within the third cavity and adjacent to the opening configured to discharge the liquid infused with the gas.

The device may include a plurality of openings extending through a wall of the tube to the third cavity.

The microporous hollow fibers may have ends that are sealed by the potting compound at the first end of the tube.

The microporous hollow fibers may be bent back and secured in place by the potting compound at the first end of the tube.

The first end of the housing may include a first end cap sealed to the housing. The second end of the housing may include a second end cap sealed to the housing.

The first end of the housing may include a first end cap integrally formed with the housing. The second end of the housing may include a second end cap integrally formed with the housing.

The first opening may be in the first end cap. The second opening may be in the second end cap.

At least one of the housing and the tube may be cylindrical.

In accordance with a further embodiment of the present invention, a method of infusing gas into a liquid is provided. The method may utilize the aforementioned device and may include steps of introducing the liquid into the first opening of the housing, and introducing the gas into the second opening of the housing.

The gas may be introduced at a first pressure and the liquid introduced at a second pressure wherein the first pressure is equal to or higher than the second pressure.

The gas may consist of oxygen gas and the liquid may consist of water.

In accordance with a further embodiment of the present invention, a device for infusing gas into a liquid is provided. A housing has a first end, a second end having an opening configured to receive a gas, a longitudinal axis, and a width. A tube has a first end, a second end, a longitudinal axis, and a width. The width of the tube is smaller than the width of the housing and the tube is positioned to extend through the first and second ends of the housing. The tube is positioned such that the axis of the tube is approximately parallel to the axis of the housing. The tube is configured to receive a liquid at the first end and to discharge liquid infused with a gas at the second end. A potting compound is interposed between an outside surface of the tube and an inside surface of the housing to form a first cavity within the first end of the housing. The potting compound is interposed between the outside surface of the tube and an inside surface of the housing to form a second cavity within the second end of the housing. A third cavity is formed between the housing and the tube and bounded by the potting compound at the ends of the housing. At least one opening extends through a wall of the tube to the third cavity. A plug is configured to divide the tube into a first portion and a second portion and to limit fluid flow within the tube between the first portion of the tube and the second portion of the tube. A baffle is configured to divide the third cavity into a first portion and a second portion and to limit fluid flow within the housing between the first portion of the third cavity and the second portion of the third cavity. A plurality of microporous hollow fibers extend through the potting compound at the first end of the tube and through the potting compound at the second end of the tube. Ends of the hollow fibers are open to the first cavity and to the second cavity.

The baffle may include potting compound and the plurality of microporous hollow fibers may extend through the potting compound of the baffle.

A plurality of openings may extend through a wall of the tube to the third cavity.

A vent may expel gas from the device.

The first end of the housing may include a first end cap sealed to the housing and the second end of the housing may include a second end cap sealed to the housing.

The first end of the housing may include a first end cap integrally formed with the housing and the second end of the housing may include a second end cap integrally formed with the housing.

At least one of the housing and the tube may be cylindrical.

In accordance with a further embodiment of the present invention, a method of infusing gas into a liquid is provided. The method may utilize the aforementioned device and may include steps of introducing the gas into the opening in the second end of housing, and introducing the liquid into the first end of the tube.

The gas may be introduced at a first pressure and the liquid introduced at a second pressure wherein the first pressure is equal to or higher than the second pressure.

The gas may consist of oxygen gas and the liquid may consist of water.

FIG. 1 illustrates a side sectional view of a device 100 for infusing gas into a liquid in accordance with an embodiment of the present invention. The device 100 includes a housing 102. The housing is preferably cylindrical though it may be a different shape, for example, having square, rectangular, hexagonal or oval cross-section. The housing 102 is provided with a first cap 104 at a first end of the housing 102 and a second cap 106 at a second end of the housing 102. Together, the housing 102 and caps 104 and 106 create an enclosure that is preferably gas and liquid impermeable with the exception of openings described herein. The caps 104 and 106 can be, for example, permanently bonded to the ends of the housing 102, integrally molded with the housing 102 or removably fastened with clamps or a threaded interface and sealed using O-rings.

Figure 2:
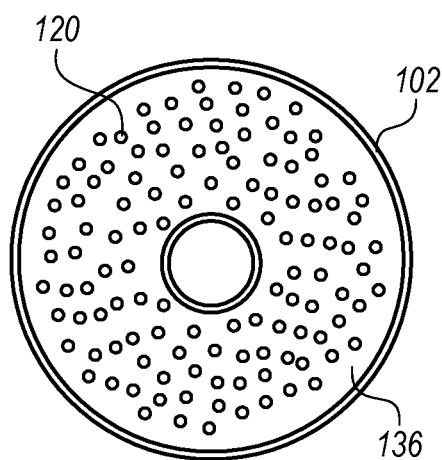
FIG. 2 illustrates a cross sectional view of a device for infusing gas into a liquid in accordance with an embodiment of the present invention.

The device 100 is equipped with an opening 108 configured to receive liquid into the device 100, an opening 110 configured to receive gas into the device 100 and an opening 112 configured to discharge liquid infused with gas from the device 100. As shown in FIG. 1, the cap 104 can be equipped the opening 108 for receiving liquid into the enclosure. The liquid can be, for example, water, though it will be apparent that another liquid can be used in connection with the device 100. As also shown in FIG. 1, the cap 106 can be equipped with the opening 110 for receiving gas into the enclosure. The gas can be, for example, oxygen, though it will be apparent that another gas can be used in connection with the device 100. As also shown in FIG. 1, the opening 112 for discharging liquid infused with gas can be located in a side wall of the housing 102. As also shown in FIG. 2, one or more additional openings 114 configured to discharge liquid infused with gas can be located in a side wall of the housing 102. In this example, the opening 114 is sealed with a cap 116 though the cap 116 could optionally be omitted or removed. Each of the openings 108, 110, 112, 114 can be equipped with threads or other fittings configured to connect to external equipment, tubing, hoses, or the like.

Referring to structures internal to the device 100, a tube 118, is positioned within the housing 102. The tube 118 is preferably cylindrical and positioned such that a longitudinal axis of the tube 118 is substantially parallel to a longitudinal axis of the housing 102. The tube 118 may be of shape other than cylindrical, for example, it may it have a square, rectangular, hexagonal or oval cross-section. In an embodiment, the two axes are aligned so that the tube 118 is centered within the housing 102. A plurality of microporous hollow fibers 120 are positioned within a cylindrical-shaped cavity located between the outside of the tube 118 and the inside of housing 102 and oriented lengthwise within the housing 102. The fibers 120 are preferably secured in place by potting compound 122 and 124. The fibers 220 may also be surrounded by fabric mesh or arranged in groups with each group being surrounded by fabric mesh As shown in FIG. 1, potting compound 122 is interposed between an outside surface of the tube 118 and an inside surface of the housing 102 at a first end of the tube 118. This forms a cavity 126 at the first end of the tube 118 between the potting compound 122 and the cap 104. The first end of the tube 118 has an opening 128 which is open to the cavity 126. The opening 108 of the housing 102 is also open to the cavity 126 so that liquid introduced into the opening 108 flows into the cavity 126 and then into the opening 128 of the tube 118.

Ends of the fibers 120 are preferably sealed by the potting compound 122 such that liquid introduced into the cavity 126 is unable to enter the fibers 120 and instead flows into the opening 128 of the tube 118. Alternatively to sealing any open ends of the fibers 120 in the potting compound 122 the fibers 120 may be bent back upon themselves and secured in place by the potting compound 122.

As also shown in FIG. 1, the potting compound 124 is interposed between the outside surface of the tube 118 and an inside surface of the housing 102 at a second end of the tube 118. This forms a cavity 130 at the second end of the tube 118 between the potting compound 124 and the cap 106. The second end 132 of the tube 118 is preferably closed to the cavity 130. For example, the potting compound 124 may be used to seal the end 132 of the tube 118. Alternatively, a plug or cap or some other material may be used to close the end 132 of the tube 118. The fibers 120 preferably pass through the potting compound 124 so that ends of the fibers 120 are open to the cavity 130. The opening 110 of the housing 102 is also open to the cavity 130 so that gas introduced into the opening 110 flows into the ends of the fibers 120 as the tube 118 is not open to the cavity 130. The potting compound 122 and 124 can be, for example, epoxy, resin or similar non-permeable material.

As shown in FIG. 1, the tube 118 has a plurality of openings 134 that extend through the wall of the tube 118. Liquid introduced into the device 100 enters through the opening 108 enters the opening 128 at the first end of the tube 118 and then is discharged from the tube 118 through the openings 134 and into a cavity 136. The cavity 136 is formed between the housing 102 and the tube 118 and is bounded by the potting compound 122 and 124 at the ends of the tube 118. Fibers 120 also pass through the cavity 136. At the same time that the liquid flows in the device 100, gas introduced into the opening 110 enters the cavity 130 and enters the fibers 120. Gaseous components contained in both the liquid and the gas is able to transfer between them through the pores of the fibers 120 within the cavity 136. The gas-infused liquid can then be discharged through the opening 112.

In a preferred embodiment, the gas is introduced at a pressure that is equal to or higher than a pressure at which the liquid is introduced. For example, where the gas is oxygen and the liquid is water, the oxygen may be introduced at a pressure of approximately 10 psi, whereas, the water may be introduced at a pressure of approximately 6 psi. This pressure differential aids in causing the oxygen to enter the water through the pores in the fibers and become dissolved in the water. In an embodiment, the fibers 120 are made from a material that is hydrophobic (i.e. water repellant) or are coated with a material that is hydrophobic. This aids in preventing the liquid from entering the pores of the fibers 120.

Baffles 138 can be provided that are configured to cover the openings 112 and 114. The baffles 138 can be held in place by the potting compound 120 and 122 at each end of the device 100, for example, by providing that a portion of the baffles 138 extend sufficiently into the potting compound 120 and 122 as to be secured. The baffles 138 are preferably positioned loosely over the openings 112 and 114 and include perforations so as to not impede the flow of gas-infused fluid out of the device 114. A purpose of the baffles 138 is to prevent the fibers 120 from inhibiting the flow of gas-infused liquid from the device 100 via openings 112 and 114.

FIG. 2 illustrates a cross sectional view of the device 100 illustrated in FIG. 1. The section of FIG. 2 is taken at the section line indicated as A-A in FIG. 1. As shown in FIG. 2, the fibers 120 are shown in cross-section within the cavity 136 within the housing 102. The fibers 120 are shown having substantially circular cross-sections as they are preferably hollow. However, the fibers 120 are shown having larger cross-section than the preferred fibers for illustrative purposes. In addition, in a preferred embodiment, the device 100 is provided with more fibers 120 than are illustrated in FIGS. 1 and 2.

In a preferred embodiment, the device 100 is constructed primarily of polyvinyl chloride (PVC) or similar material, such as polypropylene. Thus, in an embodiment, the housing 102, caps 104, 106, 116, tube 118, and baffles 138 can all be formed of PVC. The microporous hollow fibers 120 can be, for example, polypropylene and/or polyethylene, of a type that is commercially available. Dimensions of the housing 102 can be approximately four inches in diameter and forty inches long though it will be apparent that other dimensions can be selected.

Figure 3:
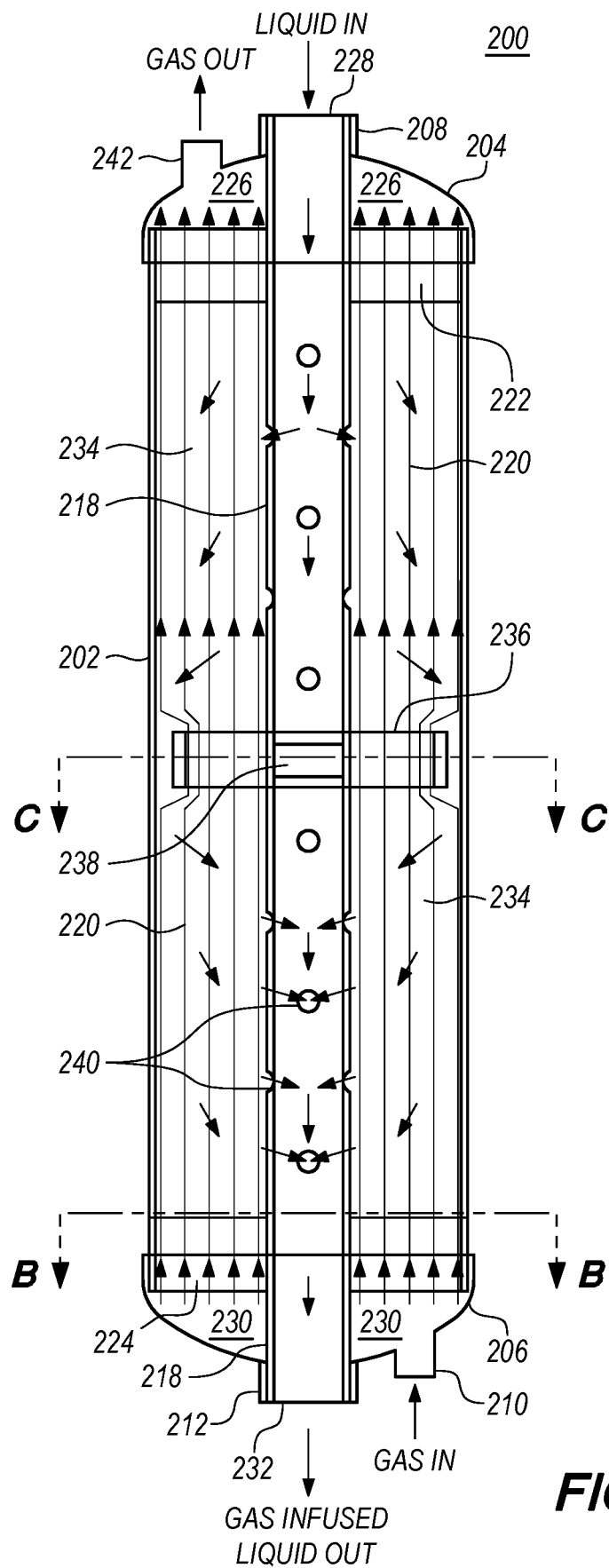
FIG. 3 illustrates a side sectional view of a device for infusing gas into a liquid in accordance with an alternative embodiment of the present invention.

FIG. 3 illustrates a side sectional view of a device 200 for infusing gas into a liquid in accordance with an alternative embodiment of the present invention. The device 200 includes a housing 202. The housing is preferably cylindrical though it may be a different shape, for example, having square, rectangular, hexagonal or oval cross-section. The housing 202 is provided with a first cap 204 at a first end of the housing 202 and a second cap 206 at a second end of the housing 202. Together, the housing 202 and caps 204 and 206 create an enclosure that is preferably gas and liquid impermeable with the exception of openings described herein. The caps 204 and 206 can be, for example, permanently bonded to the ends of the housing 202, integrally molded with the housing 202 or removably fastened with clamps or a threaded interface and sealed using O-rings.

The device 200 is equipped with an opening 208 configured to receive liquid into the device 200, an opening 210 configured to receive gas into the device 200 and an opening 212 configured to discharge liquid infused with gas from the device 200. The liquid can be, for example, water, though it will be apparent that another liquid can be used in connection with the device 200. As shown in FIG. 3, the cap 204 can be equipped with the opening 208 for receiving liquid into the enclosure. As also shown in FIG. 3, the cap 206 can be equipped with the opening 210 for receiving gas into the enclosure. The gas can be, for example, oxygen, though it will be apparent that another gas can be used in connection with the device 200. The cap 206 can be equipped with the opening 212 for discharging liquid infused with gas from the enclosure.

Referring to structures internal to the device 200, a tube 218, is positioned within the housing 202. The tube 218 is preferably cylindrical and positioned such that a longitudinal axis of the tube 218 is substantially parallel to a longitudinal axis of the housing 202. In an embodiment, the two axes are aligned so that the tube 218 is centered within the housing 202. The tube 218 may be of shape other than cylindrical, for example, it may it have a square, rectangular, hexagonal or oval cross-section. A plurality of microporous hollow fibers 220 are positioned within a cylindrical-shaped cavity located between the outside of the tube 218 and the inside of housing 202 and oriented lengthwise within the housing 202. The fibers 220 are preferably secured in place by potting compound 222 and 224. The fibers 220 may also be surrounded by fabric mesh or arranged in groups with each group being surrounded by fabric mesh.

As shown in FIG. 3, potting compound 222 is interposed between an outside surface of the tube 218 and an inside surface of the housing 202 at a first end of the housing 202. This forms a cavity 226 at the first end of the housing 202 between the potting compound 222 and the cap 204. The fibers 220 preferably pass through the potting compound 222 so that ends of the fibers 220 are open to the cavity 226. A first end of the tube 218 extends through the cavity 226 and into the opening 208 of the cap 204. The first end of the tube 218 has an opening 228 so that liquid introduced into the opening 208 flows into the opening 228 of the tube 218.

As also shown in FIG. 3, the potting compound 224 is interposed between the outside surface of the tube 218 and an inside surface of the housing 202 at a second end of the housing 202. This forms a cavity 230 at the second end of the housing 202 between the potting compound 224 and the cap 206. The fibers 220 preferably pass through the potting compound 224 so that ends of the fibers 220 are open to the cavity 230. A second end of the tube 218 extends through the cavity 230 and into the opening 212 of the cap 206. The second end of the tube 218 has an opening 232 so that gas infused liquid discharged from the opening 232 of the tube 218 flows out of the opening 212. The potting compound 222 and 224 can be, for example, epoxy, resin or similar non-permeable material.

As shown in FIG. 3, a cavity 234 is formed between the housing 202 and the tube 218 and is bounded by the potting compound 222 and 224 at the ends of the housing 218. The fibers 220 pass through the cavity 234. A baffle 236 is configured to divide the cavity 234 into a first portion and a second portion. The baffle 236 is configured to limit fluid flow within the housing between the first and second portions of the cavity 234. While the baffle 236 limits fluid flow, it preferably does not completely block the fluid flow. For example, the baffle 236 can occupy most, but not all, of the space between the exterior wall of the tube 218 and interior wall of the housing 202.

The device 200 is also preferably provided with a plug 238 which is configured to limit fluid flow within the tube 218. More particularly, the plug 238 divides the tube 218 into a first portion and a second portion and is configured to limit fluid from flow within the tube between the first portion of the tube and the second portion of the tube. The plug 238 can partially limit, or completely block, fluid flow within the tube 218.

As shown in FIG. 3, the tube 218 has a plurality of openings 240 that extend through the wall of the tube 218. Liquid enters through the opening 208 at the first end of the device 200 and though the opening 228 at the first end of the tube 218. The liquid flows along the tube 218 and exits the tube 218 through the openings 240 into the first portion of the cavity 234. The liquid is directed into the first portion of the cavity 234 by the plug 238. The liquid flows from the first portion of the cavity 234 to the second portion if the cavity 234 though this movement is restricted by the baffle 236. Thus, in accordance with an embodiment, the baffle 236 and plug 238 operate to direct the fluid to flow radially outward from the tube 218 in the first portion of the cavity 234 and radially inward toward the tube 218 in the second portion of the housing 202. This tends to maximum fluid contact with the fibers 220 and, therefore, also tends to maximize gas transfer to the fluid.

At the same time that the liquid flows in the device 200, gas introduced into the opening 210 enters the cavity 230 and is directed into the ends of the hollow fibers 220 at the second end of the device 200. The gas passes through the potting compound 224 and enters the cavity 234 within the fibers 220. Gaseous components contained in both the liquid and the gas are able to transfer between them through the pores of the fibers 220 within both portions of the cavity 234. This process infuses the gas into the liquid. The gas-infused liquid then enters the second portion of the tube 218 through the openings 240 and is then discharged from the device 200 through the opening 232 in the second end of the tube 218.

In a preferred embodiment, the gas is introduced at a pressure that is equal to or higher than a pressure at which the liquid is introduced. For example, where the gas is oxygen and the liquid is water, the oxygen may be introduced at a pressure of approximately 10 psi, whereas, the water may be introduced at a pressure of approximately 6 psi. This pressure differential aids in causing the oxygen to enter the water through the pores in the fibers and become dissolved in the water. In an embodiment, the fibers 220 are made from a material that is hydrophobic (i.e. water repellant) or are coated with a material that is hydrophobic. This aids in preventing the water from entering the pores of the fibers 220. The presence of the baffle 236 aids in the infusion process by increasing contact between the liquid and the gas containing fibers 220 before exiting the device 200.

A vent opening 242 may be provided for expelling excess gas from the device 200. The vent opening 242 may be equipped with a valve that allows gas, such as air or excess oxygen to be vented from the device 200. As shown in FIG. 3, the vent opening can be located in the end cap 204.

Figure 4:
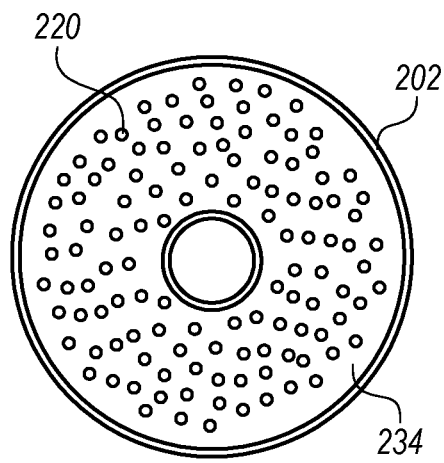
FIG. 4 illustrates a cross sectional view of a device for infusing gas into a liquid in accordance with an alternative embodiment of the present invention.

FIG. 4 illustrates a first cross sectional view of the device 200 illustrated in FIG. 3. The section of FIG. 4 is taken at the section line indicated as B-B in FIG. 3. The fibers 220 are shown in FIG. 4 in cross-section within the cavity 234 within the housing 202.

Figure 5:
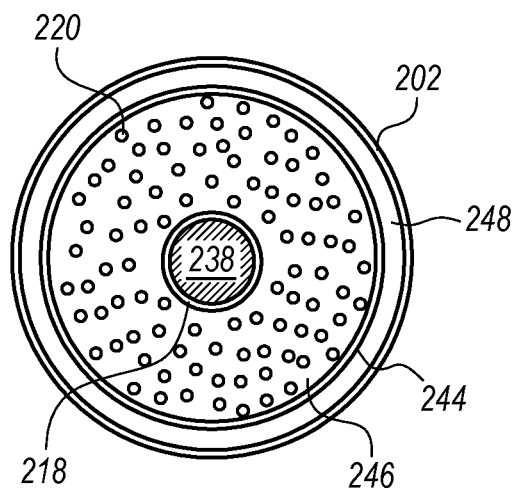
FIG. 5 illustrates a cross sectional view of a device for infusing gas into a liquid in accordance with an alternative embodiment of the present invention.

FIG. 5 illustrates a second cross sectional view of the device 200 illustrated in FIG. 3. The section of FIG. 5 is taken at the section line indicated as C-C in FIG. 5. Thus, FIG. 5 shows a cross section of housing 202 at the location of the baffle 236. In an embodiment, the baffle 236 has an outer shell 244. Within the shell 244, potting compound 246 can be used to hold the fibers 220 in place so that the fibers 220 pass through the baffle 236. A passage 248 is provided so that fluid is able to flow around the baffle 236 and between the first and second portions of the cavity 234. The passage 248 can be formed by providing that the shell 244 is circular having a diameter that is smaller than that of the interior diameter of the housing 202. In this embodiment, the passage 248 entirely encircles the baffle 236. It will be apparent that other configurations of the baffle 238 can be utilized. For example, a baffle could fill the entire cross section of the housing 202 with multiple passages of various sizes and/or shapes provided in the baffle.

The fibers 220 are shown in FIGS. 4 and 5 having substantially circular cross-sections as they are preferably hollow. However, the fibers 120 are shown having larger cross-section than the preferred fibers for illustrative purposes. In addition, in a preferred embodiment, the device 200 is provided with more fibers 220 than are illustrated in FIGS. 4 and 5.

In a preferred embodiment, the device 200 is constructed primarily of polyvinyl chloride (PVC) or similar material, such as polypropylene. Thus, in an embodiment, the housing 202, caps 204, 206, tube 218, baffle shell 244 and plug 238 can all be formed of PVC. The microporous hollow fibers 220 can be, for example, polypropylene and/or polyethylene, of a type that is commercially available. Dimensions of the housing 202 can be approximately four inches in diameter and forty inches long though it will be apparent that other dimensions can be selected.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A device for infusing gas into a liquid comprising:
   a housing comprising: a first end having a first opening configured to receive a liquid; a second end having a second opening configured to receive a gas; and a central section having a third opening configured to discharge the liquid infused with the gas from the device;
   a tube having a first end, a second end, a longitudinal axis and a width, wherein the width of the tube is smaller than a width of the housing and the tube is positioned within the housing such that the axis of the tube is approximately parallel to a longitudinal axis of the housing;
   a potting compound interposed between an outside surface of the tube and an inside surface of the housing at the first end of the tube wherein a first cavity is formed at the first end of the tube and the first end of the tube and the first opening of the housing are open to the first cavity, and the potting compound interposed between the outside surface of the tube at the second end of the tube and an inside surface of the housing wherein a second cavity is formed at the second end of the tube and the second end of the tube is closed to the second cavity and the second opening in the housing is open to the second cavity, and wherein a third cavity is formed between the housing and the tube and bounded by the potting compound at the ends of the tube wherein the third opening in the housing is open to the third cavity;
   at least one opening extending through a wall of the tube to the third cavity; and
   a plurality of microporous hollow fibers extending from the potting compound at the first end of the tube, and extending through the third cavity and extending through the potting compound at the second end of the tube, wherein the hollow fibers are open to the second cavity.

2. The device according to claim 1, further comprising a baffle positioned within the third cavity and adjacent to the opening configured to discharge the liquid infused with the gas.

3. The device according to claim 1, further comprising a plurality of openings extending through a wall of the tube to the third cavity.

4. The device according to claim 1, wherein the microporous hollow fibers have ends that are sealed by the potting compound at the first end of the tube.

5. The device according to claim 1, wherein the microporous hollow fibers are bent back and secured in place by the potting compound at the first end of the tube.

6. The device according to claim 1, wherein the first end of the housing comprises a first end cap sealed to the housing and wherein the second end of the housing comprises a second end cap sealed to the housing.

7. The device according to claim 6, wherein the first opening is in the first end cap and the second opening is in the second end cap.

8. The device according to claim 1, wherein the first end of the housing comprises a first end cap integrally formed with the housing and wherein the second end of the housing comprises a second end cap integrally formed with the housing.

9. The device according to claim 8, wherein the first opening is in the first end cap and the second opening is in the second end cap.

10. The device according to claim 1, wherein at least one of the housing and the tube is cylindrical.

11. A method of infusing a gas into a liquid utilizing the device of claim 1, comprising:
    introducing the liquid into the first opening of the housing; and
    introducing the gas into the second opening of the housing.

12. The method according to claim 11, wherein the gas is introduced at a first pressure and the liquid is introduced at a second pressure wherein the first pressure is equal to or higher than the second pressure.

13. The method according to claim 11, wherein the gas consists of oxygen gas and the liquid consists of water.

\* \* \* \* \*